Nov. 7, 1933.  J. J. FISCHER ET AL  1,934,180
BLOWER MILL
Filed June 9, 1932   2 Sheets-Sheet 1
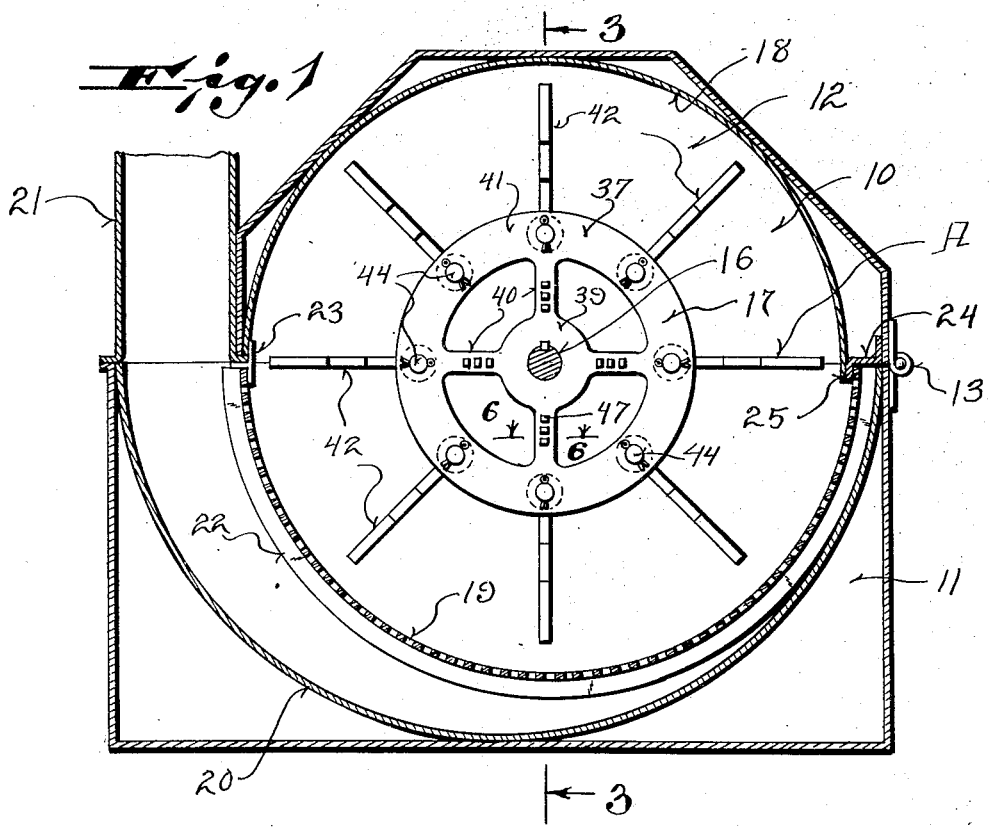
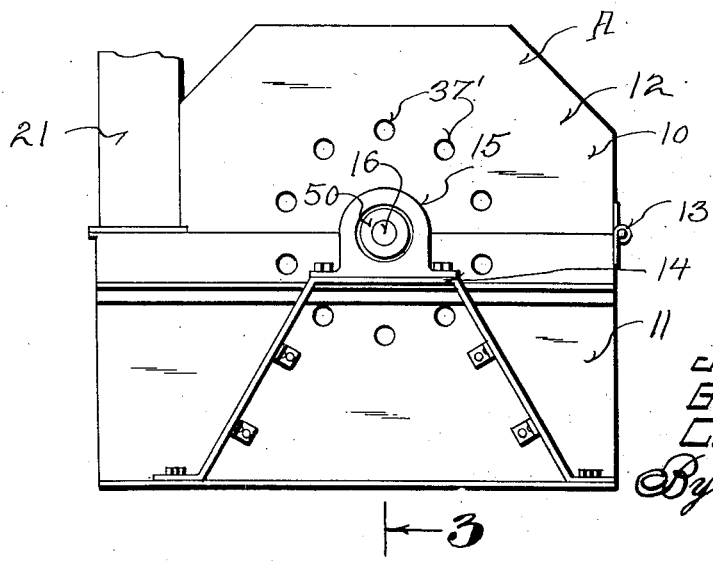
Inventors
J. J. Fischer
G. A. Zorn
C. J. Harris
Attorneys

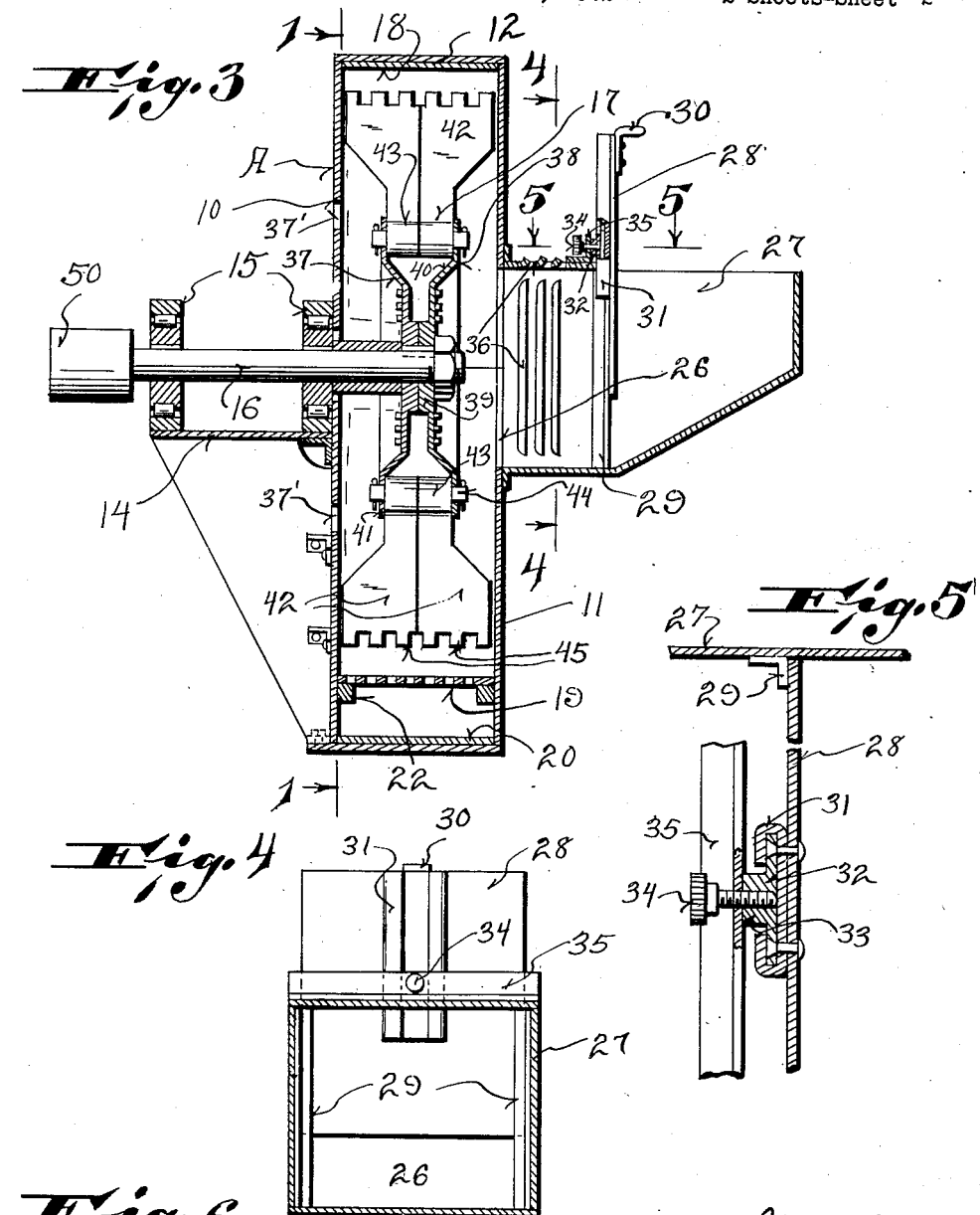

Patented Nov. 7, 1933

1,934,180

UNITED STATES PATENT OFFICE 1,934,180

BLOWER MILL

John J. Fischer, George A. Zorn, and Claude J. Harris, Waukesha, Wis., assignors to William A. Rosenau, Waukesha, Wis.

Application June 9, 1932. Serial No. 616,238

2 Claims. (Cl. 83—11)

This invention appertains to grinding devices for operating on various kinds and types of materials to reduce or comminute the same.

One of the primary objects of our invention is to provide an improved mill in which the blower fan is incorporated directly therein for drawing the material into the mill and for discharging the comminuted material from the mill, the blades of the blower fan acting in conjunction with a semi-circular screen for bringing about the reduction of the material.

Another important object of our invention is the provision of novel means for forming the casing of the blower mill and novel means for associating the semi-circular screen with the casing, whereby the screen can be readily and quickly removed, so that screens of different characters having different size openings or the like can be associated with the mill.

A further object of our invention is the provision of a blower mill embodying a casing including upper and lower substantially semi-cylindrical sections hingedly connected together with means on the lower section for receiving and supporting the semi-circular screens, the upper section acting in conjunction with the lower section for detachably holding the screen in place against movement when the sections are in their operative position.

A further object of our invention is the provision of novel means for forming the combination blower fan and grinder head whereby the same will function to effectively draw in and discharge the material and to reduce the material to the desired state of fineness.

A further object of our invention is the provision of an improved combination blower fan and grinder head having a plurality of sectional radially extending blades associated therewith, the ends of the blades being provided with disintegrating teeth for acting on the material.

A further object of our invention is the provision of novel means for forming the spokes or arms of the blower fan, whereby the arms will function to act initially on the material as the same is drawn into the mill, so as to reduce the active size of the material prior to the material reaching the ends of the fan blades and screens.

A further object of our invention is the provision of novel means for regulating the flow of the material to be reduced into the mill with novel means for insuring the proper amount of air into the mill with the material irrespective of the active sizes of the means for governing the flow of the material into the mill.

A still further object of our invention is to provide an improved combination mill and blower of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a longitudinal section through the improved blower mill taken on the line 1—1 of Figure 3 looking in the direction of the arrows.

Figure 2 is a side elevation of the improved blower mill.

Figure 3 is a transverse section through the mill taken on a plane indicated by the lines 3—3 of Figures 1 and 2.

Figure 4 is a detail section taken on the line 4—4 of Figure 3 looking in the direction of the arrows illustrating the novel means employed controlling the flow of material into the mill.

Figure 5 is an enlarged detail horizontal section taken on the line 5—5 of Figure 3 looking in the direction of the arrows illustrating the means employed for holding the control gate in an adjusted position.

Figure 6 is an enlarged detail sectional view through one of the spokes or arms of the blower fan.

Referring to the drawings in detail, wherein similar reference characters designate the corresponding parts throughout the several views, the letter A generally indicates the improved blower mill, which comprises a casing 10. This casing 10 embodies a lower body section 11 and an upper cover section 12. These sections can be connected together at one end by means of a suitable hinge 13 or the like. This allows the raising and lowering of the cover section 12 relative to the body section 11.

Rigidly connected with one side wall of the body section 11 is a supporting platform 14 on which is mounted suitable bearings 15 for rotatably supporting the operating shaft 16. This shaft 16 extends into the casing 10 and supports our novel blower fan and grinder head 17, which will be later described in detail.

The upper cover section 12 has rigidly connected therewith a semi-circular shaped guard and guide plate 18 which is concentric with the axis of the shaft 16. The lower body section 11 supports the semi-circular screen plate 19, which is also concentrically disposed relative to the shaft and this screen plate is held in position in a novel manner, as will also be later described. Arranged below the screen plate 19 is an eccentrically disposed blower or carrier plate 20 and this plate extends up to the horizontal center of the casing and comminutes with the discharge outlet 21. Thus, it is to be noted that the discharge of the device is arranged above the longitudinal center of the mill and extends substantially tangentially from the periphery of the guard plate 18.

Rigidly connected with the opposite side walls of the body section 11 are the semi-circular supporting straps 22. These straps or cleats 22 form a guide and rest for the screen 19 and the screen rests directly upon the same.

The lower section 11 of the casing at one end is provided with a transversely extending T-shaped cross rail 23 and one end of the screen 19 is adapted to engage under the rail 23, whereby this end of the screen will be held rigidly in place.

The cover section 12 adjacent to the hinge 13 carries a cross strip 24 and this strip is adapted to overlie the adjacent end of the screen 19 and functions to hold the screen on the supporting straps 22 and in engagement with the cross rail 23. As shown, the cross plate 24 has its forward end down-turned to provide a retaining flange 25 which engages the inner top face of the screen 19.

When the cover section 12 is in its lowered position, the guard plate 18 engages the upper flange of the front cross rail 23, as clearly shown in Figure 1 of the drawings.

From the description so far, it can be seen that when it is desired to remove the screen, it is merely necessary to swing back the cover section 12, which will carry the cross plate 24 away from the screen and the screen can then be slid on the supporting straps 22 away from the rail 23 and out of the casing. This allows the association of different meshes of screens with this casing.

The opposite side of the casing from the shaft 16, is provided with an enlarged entrance opening 26 and the cover section has rigidly connected therewith the delivery or intake spout 27. The spout 27 has its upper front end open so that the material to be ground can be fed into the spout from a suitable delivery hopper or the like. A sliding gate 28 is provided for controlling the flow of material from the spout into the casing and this gate can be formed from sheet metal or any other desired material and normally rests against angle-shaped guides 29 rigidly secured to the opposite sides of the spout. A manipulating handle 30 is connected with the upper end of the gate so that the same can be readily raised or lowered by the operator. In order to hold the gate in an adjusted position, the rear face of the same is provided with a guide-way 31 which slidably supports a lock strap 32. The lock strap 32 is provided with a threaded boss 33 into which is received an adjusting screw 34 carried by an angle bar 35 rigidly connected with the spout. By operating the thumb screw 34 the lock strap 32 can be brought into binding contact with the walls of the guide and thereby hold the gate against slipping movement.

In order to insure the proper introduction of air into the casing, where the gate is in an adjusted lowered position, the intake spout between the gate and the casing can be provided with out-struck louvers 36. These louvers constitute air intake ports. If preferred, a wall of the casing on the opposite side from the intake spout can be provided with vent opening 37'.

As heretofore intimated, one of the important features of our invention is the use of the novel combined blower fan and grinder head 17. This combined blower fan and grinder head 17 comprises a pair of like companion hub plates 37 and 38 of circular form. Each of these hub plates include a hub sleeve 39, radially extending spokes or arms 40 and the circular rims 41. The spokes are preferably bowed outwardly, so that the rims 41 of the hub plates are spaced apart one from the other.

Received between the rims 41 are the blades 42. These blades 42 can either be rigidly connected with the hub plates or can be pivotally connected therewith for swinging movement. We prefer to make each blade in two companion sections and the inner ends of the sections are provided with bearing sleeves 43 which receive the holding pins 44. These holding pins 44 extend through the rims and can be held against displacement by cotter keys or the like.

The fan blades 42 flare outwardly from the bearing sleeves 43 and the extreme outer edges of the flared portions of the blades are provided with grinding teeth 45.

We also prefer to construct the fan in such a manner that the same will initially act on the material as the material is introduced into the casing. Thus, the opposite sides of the spokes can be beveled as at 46 to provide cutting edges. Also, the outer faces of the spokes can be provided with grinding teeth 47.

From the foregoing description, it can be seen that we have provided a novel blower mill in which the flow of material can be effectively controlled into the mill and in which the material will be at once acted upon by the blower head and forced into grinding contact with the screen 19 and due to the rapid rotation of the blower, the material will be forced into intimate contact with the screen and will be comminuted and forced through the apertures in the screen and then out of the delivery spout 21.

Obviously, the shaft 16 can be rotated from a suitable prime mover in any desired way and as shown, a pulley wheel 50 is connected with the shaft.

The construction of the blower fan is such that the blades can be readily removed when worn and the entire fan head can be quickly assembled or taken apart.

Changes in details may be made without departing from the spirit or the scope of this invention but what we claim as new is:

1. In a blower mill, a casing, a combined blower fan and grinder head rotatably mounted in the casing including a pair of companion circular hub discs, each of said discs having a hub sleeve, radially extending spokes and an annular rim, radially extending fan blades having their inner ends provided with bearing sleeves disposed between the rims, pins extending through the hub sleeves and rims, and radially extending teeth formed on the ends of the blades, each of said blades including a pair of companion sections, an intake spout arranged at the axial center of the casing, and said spokes of the hub discs having their opposite edges beveled to provide cutting edges.

2. In a blower mill, a casing, a combined blower fan and grinder head rotatably mounted in the casing including a pair of companion circular hub discs, each of said discs having a hub sleeve, radially extending spokes and an annular rim, radially extending fan blades having their inner ends provided with bearing sleeves disposed between the rims, pins extending through the hub sleeves and rims, and radially extending teeth formed on the ends of the blades, each of said blades including a pair of companion sections, an intake spout arranged at the axial center of the casing, and said spokes of the hub discs having their opposite edges beveled to provide cutting edges, and biting teeth carried by the outer face of the spokes.

JOHN J. FISCHER.
GEORGE A. ZORN.
CLAUDE J. HARRIS.